Patented May 14, 1940

2,200,931

UNITED STATES PATENT OFFICE 2,200,931

FABRIC WRINKLEPROOFING AND WATER-PROOFING COMPOSITION

Perry M. Moore, Bloomfield, N. J.

No Drawing. Application April 13, 1937,
Serial No. 136,526

11 Claims. (Cl. 260—29)

This invention relates to a process of rendering fabrics crease-resisting and waterproof and the resin composition therefor.

Urea-formaldehyde resins have been suggested and used for wrinkleproofing fabrics. If this resin is in the proper form it can be successfully deposited in the fabric and is very effective in making the fabric crease-resistant.

By reacting one mol of urea with one mol of formaldehyde in the presence of an alkaline catalyst a true solution of mono-methylol-urea is formed. When one mol of urea and two mols of formaldehyde react in the presence of an alkaline catalyst a true solution of di-methylol-urea is formed. These reactions produce true solutions which are known as the A-stage of condensation. An application of heat will produce a further condensation of the resin to produce a larger molecular structure and form true colloidal solutions. These true colloidal solutions are known as the B-stage of condensation of the resin. If the B-stage resin is heated in the presence of a catalyst such as acetic acid the condensation will proceed to the formation of a solid insoluble resin known as the C-stage of condensation.

If the urea-formaldehyde condensation product in true solution of the A-stage in the presence of an alkali is allowed to stand then condensation will continue over into the B-stage. If the solution is heated the condensation takes place much more rapidly. If acid is added to the A-stage of the urea-formaldehyde resin the condensation continues comparatively rapidly and will soon become insoluble in the C-stage.

When urea-formaldehyde resin is used as a fabric-treating composition it is found that the most satisfactory results are obtained when the resin is in the A with a minor part in B stage and in such a form that the resin penetrates into the body of the fabric. When the resin has once been condensed to the insoluble stage in the fabric it is not possible to put a second coating of resin on the fabric to increase the crease-resisting properties because the second coating of resin does not penetrate the fabric but makes the fabric stiff and unsuitable for use. Accordingly the operation of treating a fabric for crease-resisting properties and waterproofing requires that the entire operation be accomplished in one impregnating operation.

It has been believed essential in the past that the urea-formaldehyde resin must be used in a state of condensation slightly past the A-stage but before it becomes water-insoluble if it is to be effectively applied to a fabric to give the fabric crease-resisting properties. It has been found that if the condensation had been promoted too far into the B-stage that the fabric would be too stiff for many purposes. To obtain the proper impregnation of the fabric with the resin therefor requires that the condensation must be carried on very carefully under controlled conditions, and that the resin be used in impregnating the fabric at exactly the proper stage of the condensation. Such reactions were not desirable for the usual factory operations where the fabrics are impregnated because the condensation of the resin required a chemically trained technician who is not usually available in a fabric factory. Therefore much loss of fabric and resin has been experienced in trying to use a urea-formaldehyde resin for wrinkleproofing fabric.

To bring the urea-formaldehyde resin properly into the C-stage of condensation it is the usual practice to bring the acidity to a pH of 6–6.5 by adding an acidic material such as acetic acid or aluminum acetate to the A or B-stage resin and when such acid-treated resin is used for wrinkleproofing fabrics it is necessary to keep the solution at a normal room temperature within plus or minus fifteen degrees. If the solution is too cold the resin will precipitate and if the solution is too warm secondary reactions will make the resin unfit for use.

One object of the present invention is to provide a method of impregnating fabrics with urea-formaldehyde resin which is readily dispersible in water and which will effectively penetrate the fabric.

Another object of the invention is to provide a method of stabilizing a urea-formaldehyde resin by which it may be made under strictly chemically controlled conditions and preserved for a long period of time.

Another object of the invention is to provide a urea-formaldehyde resin that is stabilized and can be readily modified to give the desired consistency for the proper treatment of or impregnation of fabrics.

A further object of the invention is to provide a urea-formaldehyde resin solution which is stabilized and capable of imparting crease-resisting and waterproofing properties to fabrics.

The following are examples of urea-formaldehyde resin compositions which are stabilized for storage.

60 grams of urea are reacted with 106 grams of 40% formaldehyde by heating at 40° C. until the urea is in true solution. This resin is in the A- stage of condensation and can then be stabilized by adding thereto 4 cc. of triethanolamine. The triethanolamine acts as the stabilizing reagent for the resin and holds it in a condition which is not too insoluble in water for efficient impregnation of the fabric although there may be some of the resin promoted to the B-stage. The triethanolamine is an alkaline reacting compound and the amount thereof modifies the length of time for which the A-stage resin will be stable. The resin formed by the above condensation will be a mixture of mono- and dimethylol-urea and 4 cc. of trimethanolamine for this amount of resin reaction products will be sufficient when with a wax emulsion to stabilize the resin for a long period of time, that is a year or more. If it is intended to use the resin in less time than a year a smaller amount of triethanolamine may be used. If more than 5 cc. of triethanolamine are used this will not be objectionable to the stabilized compound. Most commercial resins are mixtures of mono- and dimethylol-urea and this mixture may be effectively stabilized with 4% by volume of triethanolamine.

In place of triethanolamine, for stabilizing the urea resin, can be substituted hexamethylenetetramine, diethylamine, trimethylamine, trimethylbenzylammonium hydroxide and other organic ammonium derivatives may be used. In some cases ammonium hydroxide has been found satisfactory.

A wrinkleproofing wax emulsion for use with the stabilized resin for the purpose of crease-resisting fabrics may be made up as follows:

| | Per cent |
| --- | --- |
| Paraffin wax | 30 to 40 |
| Triethanolamine oleate | 4 to 8 |
| Glue | 4 to 8 |
| Water to make | 100 |

The glue in the composition acts as a protective colloid to the solution during storage and in place of glue may be used albumen or casein. The triethanolamine oleate is used as an emulsifying agent and in place of this material other emulsifying agents may be used such as sodium oleate or a sulfonated petroleum oil or a sodium salt of isopropylnaphthalene sulfonic acid.

To 55 grams of the stabilized resin described above may be added 37 grams of the wrinkleproofing wax emulsion just described and this mixture may be allowed to stand for a very long period. This mixture is easily dispersible in water and fabric is readily impregnated with such a mixture. The wax emulsion along with the alkaline stabilizer prevents the urea resin from progressing beyond the B-stage of condensation and holds the resin to a large degree in the A-stage of condensation. This mixture may be used for crease-resisting fabrics by using three to eight ounces of the urea-resin-wax emulsion mixture to one gallon of water and immersing the fabrics in the water solution to thoroughly impregnate the fabrics with this solution. The proportion of three to eight ounces per gallon of water is given to outline the preferred limits of dilution of the resin-wax emulsion mixture in determining the amount of resin to be carried by the fabric. Three ounces per gallon of water provides about the least amount of resin to be used in a fabric in order to give it the crease-resisting properties. Furthermore the types of fabrics, such as natural silks, cottons, linens, artificial silks and the like require different amounts of the resin in order to give the desired crease-resisting properties. For all of the different fabrics which have been tested three to eight ounces of the resin-wax emulsion per gallon of water has been found satisfactory.

When it is desired to impart waterproof properties to the fabric as well as crease-resisting properties a waterproof wax emulsion solution may be used with the stabilized urea resin substantially as follows:

| | Parts |
| --- | --- |
| Paraffin wax | 25 |
| Isopropylnaphthalene sulfonate | 2 |
| Glue | 5 |
| Water | 62 |
| Aluminum formate | 6 |

Other emulsifying agents such as high molecular weight organic amines of the formula

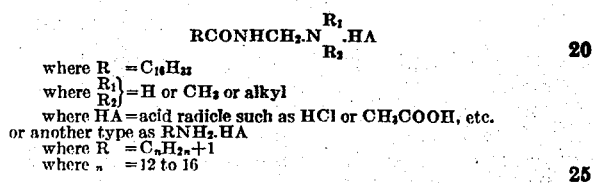

where $R = C_{16}H_{33}$
where $\left.\begin{array}{l}R_1 \\ R_2\end{array}\right\} = H$ or $CH_3$ or alkyl
where $HA$ = acid radicle such as $HCl$ or $CH_3COOH$, etc.
or another type as $RNH_2 \cdot HA$
where $R = C_nH_{2n+1}$
where $n = 12$ to $16$ can be substituted for the isopropylnaphthalene sulfonate. In place of aluminum formate, aluminum acetate may be used or a mixture of aluminum acetate and aluminum formate in equal parts may be used. This wax mixture is preferably treated with a small amount of preservative such as chlorophenol or cresol. Equal parts of this wax mixture may be added to the stabilized urea-resin-wax mixture above referred to and such a mixture is then diluted with water in the same ratio as that referred to above with the crease-resisting urea-resin waterproofing wax mixture, that is three to eight ounces of the combined stabilized urea resin waterproofing and wrinkleproofing wax mixture with one gallon of water. In place of the waterproofing wax mixture above described standard products on the market may be used which are sold under the tradenames Ramesit KA, Migasol, Impregnole, Airdex, Cerol and Napo ATO. That is these tradenamed waterproofing compounds are known to contain paraffin wax emulsions and aluminum formate or aluminum acetate. These tradenamed paraffin wax emulsions can be mixed with equal parts of the stabilized urea resin having the wrinkleproofing paraffin wax emulsion therein.

To promote the condensation of the stabilized urea in the fabric it is preferred to make the solution slightly acid to an acid pH of 6-6.5 with an acid composition such as acetic acid and pass the impregnated fabric over a heated mandril. The waterproofing wax emulsion containing the aluminum acetate or formate reacts acid and thus will help to promote the condensation of the resin to the insoluble state when heating. To this mixture, however, may be added an acid to accelerate the condensation of the product.

In place of using one mol of urea and one mol of formaldehyde in making up the resin, one mol of urea and two mols of formaldehyde may be used to make the dimethylolurea compound. This dimethylolurea compound may be substituted for the mono-methylolurea compound in making up the resin for treating the fabric. If for one mol of urea between one and two mols of formaldehyde are used in the condensation a mixture of the mono- and dimethylolureas will be formed and this mixture may be substituted for the mono- or dimethylolurea. Furthermore thiourea may be used in place of urea for the manufacture of the resin.

The invention having been thus described what is claimed is:

1. A resin composition suitable for making fabrics crease-resistant consisting essentially of an aqueous solution of mono-methylolurea made alkaline with an organic alkaline reacting amine compound condensed to the water-soluble stage and stabilized against condensation to the insoluble stage while in storage with a paraffin wax water emulsion.

2. A resin composition suitable for making fabrics crease-resisting consisting essentially of an aqueous solution of mono- and dimethylolurea condensed to a stage not beyond the B-stage in the presence of triethanolamine and mixed with equal parts of a paraffin wax water emulsion to stabilize it against condensation to the insoluble stage while in storage.

3. A resin composition suitable for making fabrics crease-resisting consisting essentially of a dimethylolurea resin condensed to the water-soluble stage of condensation and not beyond the B-stage in the presence of triethanolamine and stabilized with a paraffin wax water emulsion against condensation to the insoluble stage while in storage.

4. A resin composition suitable for making fabrics crease-resisting consisting essentially of an alkaline reacting product of urea and formaldehyde condensed in the presence of triethanolamine to the water-soluble stage and not beyond the B-stage, said resin being stabilized with a paraffin wax water emulsion and capable of being condensed to an insoluble stage with an acid reacting compound.

5. A resin composition suitable for making fabrics crease-resisting comprising essentially a reaction product of formaldehyde and urea condensed to the water-soluble stage and not beyond the B-stage in the presence of triethanolamine and mixed with 30 to 40% paraffin wax, 4 to 8% sodium oleate, 4 to 8% glue, and water to make 100% to stabilize it against condensation to the insoluble stage while in storage.

6. A resin composition suitable for making fabrics crease-resisting comprising essentially a reaction product of formaldehyde and urea condensed in the presence of triethanolamine to a stage in which it is sufficiently soluble in water for efficient impregnation of a fabric and to a stage not beyond the B-stage, and stabilized with emulsions comprising 30 to 40% paraffin wax, 4 to 8% sodium oleate, 4 to 8% glue, water to make 100%; and a second emulsion comprising 25 parts of paraffin wax, 6 parts aluminum formate, 5 parts glue, 2 parts isopropylnaphthalene sulfonate, 62 parts of water.

7. A resin composition suitable for making fabrics crease-resisting comprising essentially an aqueous solution of the condensation product of urea and formaldehyde in the presence of triethanolamine, the said product being condensed to a stage not beyond the B-stage and stabilized with an emulsion comprising 30 to 40% paraffin wax, 4 to 8% sodium oleate, 4 to 8% glue, water to make 100%, said resin and emulsion being mixed in the proportion of 55 parts of resin to 37 parts of emulsion.

8. A resin composition suitable for making fabrics crease-resisting and waterproof, comprising essentially a stabilized alkaline reacting condensation product of urea and formaldehyde condensed principally to a stage in which it is sufficiently soluble in water for efficient impregnation of a fabric and to a stage not beyond the B-stage, the said product being mixed with a paraffin wax emulsion containing aluminum acetate to stabilize it against condensation to the insoluble stage while in storage.

9. A resin composition suitable for making fabrics crease-resisting and waterproof, comprising essentially a stabilized alkaline reacting condensation product of urea and formaldehyde condensed principally to a stage in which it is sufficiently soluble in water for efficient impregnation of a fabric and to a stage not beyond the B-stage, and the said product being mixed with and stabilized against further condensation with a paraffin wax emulsion containing aluminum acetate and aluminum formate and capable of being condensed to the insoluble stage with heat and adjusted acidity.

10. A resin composition suitable for making fabrics crease-resistant and waterproof, comprising essentially a stabilized alkaline reacting condensation product of urea and formaldehyde condensed principally to a stage in which it is sufficiently soluble in water for efficient impregnation of a fabric and to a stage not beyond the B-stage, the said product being mixed with a water emulsion comprising 25 parts paraffin wax, 62 parts water, 5 parts glue, 6 parts aluminum acetate and 2 parts isopropylnaphthalene sulfonate and capable of being condensed to the insoluble stage with heat and adjusted acidity.

11. A resin composition suitable for crease-resisting fabrics comprising essentially a resin product in the water-soluble stage and not beyond the B-stage of urea and formaldehyde condensed in the presence of 4% by weight of triethanolamine and stabilized with a paraffin wax emulsion, and capable of being condensed to the insoluble stage with acetic acid and heating.

PERRY M. MOORE.